US012311666B2

(12) United States Patent
Mizuta et al.

(10) Patent No.: US 12,311,666 B2
(45) Date of Patent: May 27, 2025

(54) LIQUID EJECTING HEAD, LIQUID EJECTING APPARATUS, AND NOZZLE SUBSTRATE

(71) Applicant: SEIKO EPSON CORPORATION, Tokyo (JP)

(72) Inventors: Shohei Mizuta, Matsumoto (JP); Yuma Fukuzawa, Matsumoto (JP); Akira Miyagishi, Shiojiri (JP); Toshiro Murayama, Fujimi (JP); Madoka Ito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 153 days.

(21) Appl. No.: 18/347,963

(22) Filed: Jul. 6, 2023

(65) Prior Publication Data

US 2024/0009996 A1 Jan. 11, 2024

(30) Foreign Application Priority Data

Jul. 7, 2022 (JP) ................................ 2022-109398

(51) Int. Cl.
*B41J 2/14* (2006.01)

(52) U.S. Cl.
CPC ....... *B41J 2/14233* (2013.01); *B41J 2/14201* (2013.01); *B41J 2/1433* (2013.01); *B41J 2002/14241* (2013.01); *B41J 2002/14306* (2013.01); *B41J 2002/14475* (2013.01); *B41J 2202/11* (2013.01)

(58) Field of Classification Search
CPC .. B41J 2/14233; B41J 2/14201; B41J 2/1433; B41J 2002/14241; B41J 2002/14306; B41J 2002/14475; B41J 2202/11
See application file for complete search history.

(56) References Cited

U.S. PATENT DOCUMENTS

| | | | | |
|---|---|---|---|---|
| 9,272,517 | B2 * | 3/2016 | Kawamura | .......... B41J 2/14209 |
| 2014/0293259 | A1 | 10/2014 | Manabe et al. | |
| 2017/0274652 | A1 | 9/2017 | Tamai | |

FOREIGN PATENT DOCUMENTS

| | | | |
|---|---|---|---|
| EP | 2030791 | A1 | 3/2009 |
| EP | 3476606 | A1 | 5/2019 |
| JP | 2014-040023 | A | 3/2014 |
| JP | 2014-200920 | A | 10/2014 |
| JP | 2016-083928 | A | 5/2016 |

* cited by examiner

*Primary Examiner* — Geoffrey S Mruk

(74) *Attorney, Agent, or Firm* — Harness, Dickey & Pierce, P.L.C.

(57) ABSTRACT

A liquid ejecting head includes a first driving element, a first pressure chamber, and a first nozzle that is formed in a nozzle substrate, in which the first nozzle includes a first upstream nozzle portion including a first supply opening opened in a second surface of the nozzle substrate and a first bottom surface and a first downstream nozzle portion including a first ejection opening opened in a first surface of the nozzle substrate and a first coupling section opened in the first bottom surface, when viewed in a thickness direction of the nozzle substrate, a sectional area of the first upstream nozzle portion is larger than a sectional area of the first downstream nozzle portion, and a center of gravity of the first coupling section is positioned between a center of gravity of the first ejection opening and a center of gravity of the first bottom surface.

8 Claims, 7 Drawing Sheets

LIQUID EJECTING HEAD, LIQUID EJECTING APPARATUS, AND NOZZLE SUBSTRATE

The present application is based on, and claims priority from JP Application Serial Number 2022-109398, filed Jul. 7, 2022, the disclosure of which is hereby incorporated by reference herein in its entirety.

BACKGROUND

1. Technical Field

The present disclosure relates to a liquid ejecting head, a liquid ejecting apparatus, and a nozzle substrate.

2. Related Art

A liquid ejecting head that includes a nozzle substrate having nozzles for ejecting liquid such as ink and that ejects liquid from the nozzles onto a medium to form an image on the medium has been known. For example, JP-A-2014-200920 discloses a liquid ejecting head that includes nozzles each having a downstream nozzle portion that is opened in an ejection surface, from which liquid is ejected, of two surfaces of a nozzle substrate and having an upstream nozzle portion positioned closer to a channel through which liquid flows than is the downstream nozzle portion.

When a nozzle is inclined with respect to a direction perpendicular to the ejection surface, a liquid ejection direction deviates from the direction perpendicular to the ejection surface, and a position at which liquid lands on the medium thus deviates from an ideal landing position. When the position at which liquid lands on the medium deviates from the ideal landing position, quality of an image formed on the medium is reduced. Thus, JP-A-2014-200920 discloses that, in a manufacturing process, a photosensitive resin material for forming a nozzle is subjected to patterning by using a light ray having passed through an exposure-correction member to thereby suppress inclination of the nozzle with respect to the direction perpendicular to the ejection surface.

However, it is difficult to apply the aforementioned related art to the nozzle substrate that is not formed of a photosensitive resin material. Even in the case of a nozzle substrate formed of a photosensitive resin material, it is difficult to suppress inclination of the downstream nozzle portion with respect to the direction perpendicular to the ejection surface depending on the arrangement of the exposure-correction member, and the liquid ejection direction deviates from the direction perpendicular to the ejection surface, thereby causing the liquid landing position to deviate from the ideal landing position in some cases.

SUMMARY

Thus, the disclosure provides a liquid ejecting head capable of suppressing deviation of a landing position of liquid due to inclination of a nozzle, a liquid ejecting apparatus, and a nozzle substrate.

A liquid ejecting head according to a suitable aspect of the disclosure includes: a first driving element; a first pressure chamber that is partitioned on a pressure chamber substrate and applies pressure to a liquid by driving of the first driving element; and a first nozzle that is formed in a nozzle substrate, communicates with the first pressure chamber, and ejects the liquid, in which the nozzle substrate includes a first surface and a second surface closer to the pressure chamber substrate than is the first surface, the first nozzle includes a first upstream nozzle portion including a first supply opening opened in the second surface and a first bottom surface facing the first supply opening and a first downstream nozzle portion including a first ejection opening opened in the first surface and a first coupling section opened in the first bottom surface, when viewed in a thickness direction of the nozzle substrate, a sectional area of the first upstream nozzle portion is larger than a sectional area of the first downstream nozzle portion, and when viewed in the thickness direction, a center of gravity of the first coupling section is positioned between a center of gravity of the first ejection opening and a center of gravity of the first bottom surface.

A liquid ejecting apparatus according to a suitable aspect of the disclosure includes the liquid ejecting head described above.

A nozzle substrate according to a suitable aspect of the disclosure includes: a first nozzle that ejects a liquid; a first surface; and a second surface positioned opposite to the first surface, in which the first nozzle includes a first upstream nozzle portion including a first supply opening opened in the second surface and a first bottom surface facing the first supply opening and a first downstream nozzle portion including a first ejection opening opened in the first surface and a first coupling section opened in the first bottom surface, when viewed in a thickness direction of the nozzle substrate, a sectional area of the first upstream nozzle portion is larger than a sectional area of the first downstream nozzle portion, and when viewed in the thickness direction, a center of gravity of the first coupling section is positioned between a center of gravity of the first ejection opening and a center of gravity of the first bottom surface.

DESCRIPTION OF EXEMPLARY EMBODIMENTS

Figure 1:
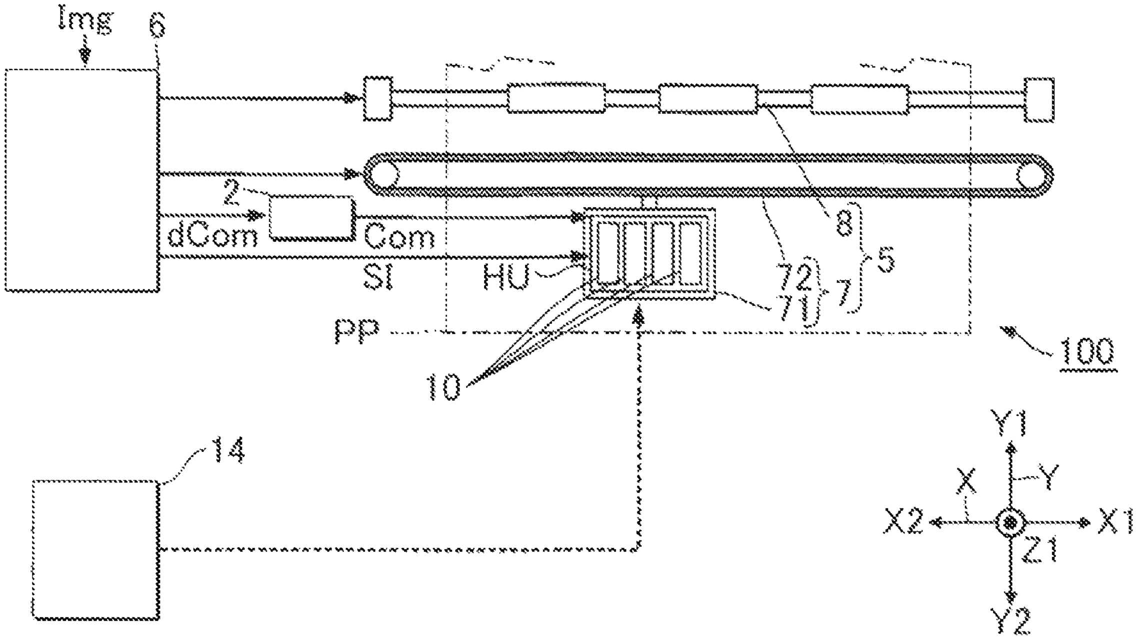
FIG. 1 is a schematic view illustrating a configuration example of a liquid ejecting apparatus 100.

An embodiment of the disclosure will be described below with reference to the drawings. Note that dimensions and scales of sections in the drawings differ appropriately from actual ones. Since the embodiment described below is a preferred specific example of the disclosure, various limitations desirable from a technical viewpoint are added. However, the scope of the disclosure is not limited to these forms as long as there is no description particularly limiting the disclosure in the following description.

For convenience of description, the following description will be given by appropriately using the X-axis, the Y-axis, and the Z-axis, which cross each other. A direction extending in the X-axis direction is an X1 direction, and a direction opposite to the X1 direction is an X2 direction. Similarly, directions opposite to each other in the Y-axis direction are a Y1 direction and a Y2 direction. Directions opposite to each other in the Z-axis direction are a Z1 direction and a Z2 direction.

Here, the Z-axis is typically an axis extending in the up-down direction, and the Z2 direction corresponds to the down direction of the up-down direction. In other words, the Z2 direction is the direction of gravity. However, the Z-axis is not necessarily the axis extending in the up-down direction and may be inclined with respect to the axis extending in the up-down direction. Moreover, the X-axis, the Y-axis, and the Z-axis are typically orthogonal to each other but are not limited thereto; they may cross each other at an angle in a range of, for example, 80 degrees to 100 degrees.

1. First Embodiment

1-1. Outline of Liquid Ejecting Apparatus 100

FIG. 1 is a schematic view illustrating a configuration example of a liquid ejecting apparatus 100. The liquid ejecting apparatus 100 is an ink jet printing apparatus that ejects ink, which is an example of a liquid, in the form of liquid droplets onto a medium PP. In the present embodiment, the liquid ejecting apparatus 100 is an ink jet printing apparatus that ejects ink, which is an example of a liquid, onto the medium PP. The medium PP is typically a printing sheet, but any printing object made from resin film, fabric, or the like may be used as the medium PP.

As illustrated in FIG. 1, the liquid ejecting apparatus 100 includes a drive signal generation circuit 2, a liquid container 14, a control module 6, a moving mechanism 5, and a liquid ejecting module HU having a plurality of liquid ejecting heads 10. In the present embodiment, the liquid ejecting module HU includes four liquid ejecting heads 10. Note that the control module 6 is an example of a control section.

The liquid container 14 is a container that accumulates ink. Examples of a specific aspect of the liquid container 14 include a cartridge detachably attached to the liquid ejecting apparatus 100, a bag-like ink pack formed from a flexible film, and an ink tank that is able to be replenished with ink. Note that any type of ink may be accumulated in the liquid container 14.

The control module 6 includes, for example, one or more processing circuits, such as a CPU and an FPGA, and one or more storage circuits, such as semiconductor memory. Here, "CPU" is an abbreviation for "central processing unit", and "FPGA" is an abbreviation for "field programmable gate array". Various programs and various kinds of data are stored in the storage circuit. The processing circuit realizes various kinds of control by executing a program and using data as appropriate.

The moving mechanism 5 changes a relative position between the medium PP and the liquid ejecting module HU. The moving mechanism 5 includes a transport mechanism 8 and a head moving mechanism 7.

The transport mechanism 8 transports the medium PP in the Y2 direction in accordance with control performed by the control module 6. In the example illustrated in FIG. 1, the transport mechanism 8 includes a transport roller elongated in the X-axis direction and a motor for rotating the transport roller. Note that the transport mechanism 8 is not limited to being configured to use the transport roller and may be configured to use, for example, a drum or an endless belt for transporting the medium PP while causing the medium PP to cling to the outer circumferential surface through an electrostatic force or the like.

The head moving mechanism 7 causes the liquid ejecting module HU to be reciprocated in the X1 direction and the X2 direction in accordance with control performed by the control module 6. In the present embodiment, the X1 direction and the X2 direction correspond to the main scanning direction, and the Y2 direction corresponds to the sub-scanning direction. In this manner, the liquid ejecting apparatus 100 in the first embodiment is a liquid ejecting apparatus of a serial type in which the liquid ejecting module HU is reciprocated in the X-axis direction. As illustrated in FIG. 1, the head moving mechanism 7 includes an accommodating case 71 that accommodates the liquid ejecting module HU and an endless belt 72 to which the accommodating case 71 is fixed. Note that the accommodating case 71 may accommodate the liquid container 14 together with the liquid ejecting module HU.

The liquid ejecting module HU ejects ink in the liquid container 14 from a plurality of nozzles N onto the medium PP in the Z2 direction in accordance with control performed by the control module 6.

The control module 6 controls an ejection operation of a liquid ejecting head 10. Specifically, the control module 6 generates a print signal SI for controlling the liquid ejecting head 10, a waveform designation signal dCom for controlling the drive signal generation circuit 2, a signal for controlling the transport mechanism 8, and a signal for controlling the head moving mechanism 7.

The waveform designation signal dCom is a digital signal for defining a waveform of a drive signal Com. The drive signal Com is an analog signal for driving a piezoelectric element PZ described later in FIG. 2. The drive signal generation circuit 2 includes a digital-to-analog conversion circuit and generates the drive signal Com having the waveform defined by the waveform designation signal dCom.

The print signal SI is a digital signal for designating a type of operation of the piezoelectric element PZ. Specifically, the print signal SI designates a type of operation of the piezoelectric element PZ by designating whether or not the drive signal Com is to be supplied to the piezoelectric element PZ. Here, designating a type of operation of the piezoelectric element PZ is, for example, designating whether or not the piezoelectric element PZ is to be driven, designating whether or not ink is to be ejected from the piezoelectric element PZ when the piezoelectric element PZ is driven, or designating the amount of ink to be ejected from the piezoelectric element PZ when the piezoelectric element PZ is driven.

The control module 6 first causes the storage circuit of the control module 6 to store print data Img supplied from a host computer, such as a personal computer or a digital camera. Next, the control module 6 generates various kinds of control signals, such as the print signal SI, the waveform designation signal dCom, a signal for controlling the transport mechanism 8, and a signal for controlling the head moving mechanism 7, in accordance with various kinds of data, such as the print data Img, stored in the storage circuit. The control module 6 then controls the liquid ejecting module HU such that the piezoelectric element PZ is driven while controlling the transport mechanism 8 and the head moving mechanism 7 so as to change the relative position of the medium PP with respect to the liquid ejecting module HU in accordance with various kinds of control signals and various kinds of data stored in the storage circuit of the control module 6. With this, the control module 6 adjusts the presence or absence of the ink ejected from the piezoelectric element PZ, an ink ejection amount, an ink ejection timing, or the like and controls execution of printing processing for forming an image corresponding to the print data Img on the medium PP.

1-2. Outline of Liquid Ejecting Head 10

Figure 2:
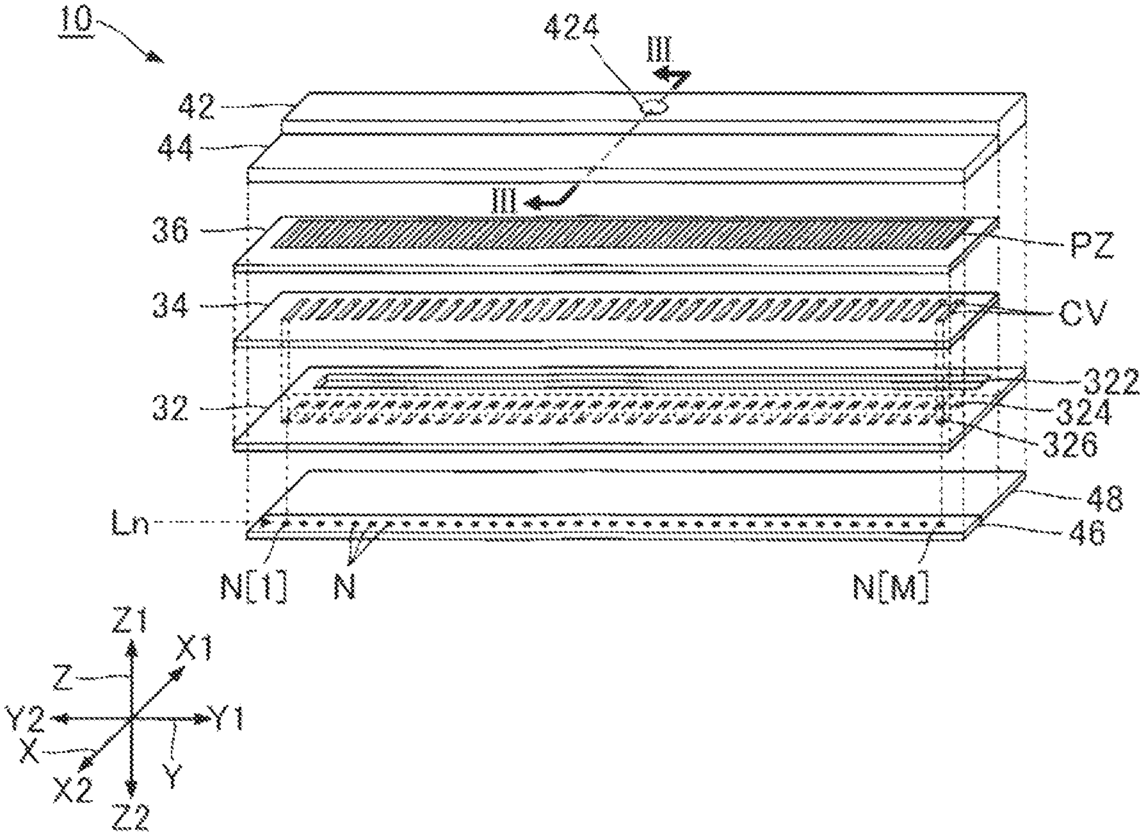
FIG. 2 is an exploded perspective view of a liquid ejecting head 10.
Figure 3:
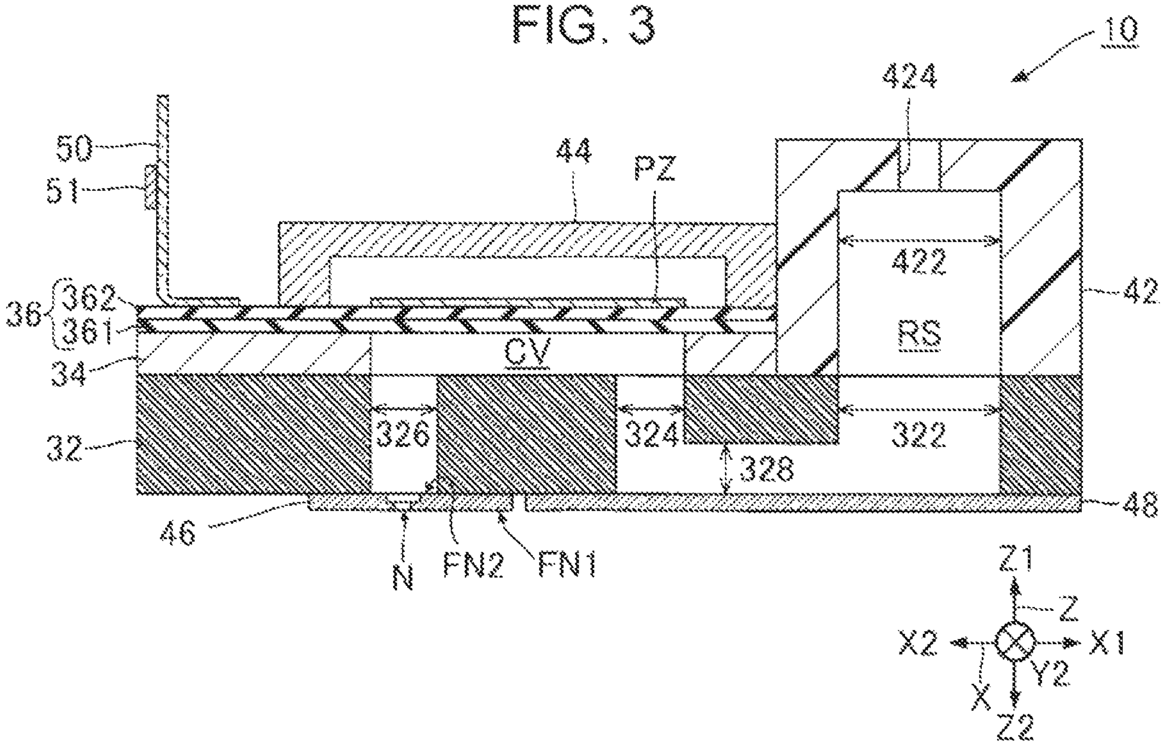
FIG. 3 is a sectional view of the liquid ejecting head 10.

An outline of the liquid ejecting head 10 will be described below with reference to FIGS. 2 and 3. FIG. 2 is an exploded perspective view of the liquid ejecting head 10. FIG. 3 is a sectional view of the liquid ejecting head 10. FIG. 3 illustrates a sectional surface of the liquid ejecting head 10 along line III-III in FIG. 2 when viewed in the Y2 direction. The sectional surface along line III-III is parallel to the XZ plane and passes through an inlet 424 described later.

As exemplified in FIGS. 2 and 3, the liquid ejecting head 10 includes a communication plate 32 having a substantially rectangular shape elongated in the Y-axis direction. A pressure chamber substrate 34, a vibration plate 36, M piezoelectric elements PZ, a housing 42, and a sealing member 44 are disposed on the surface of the communication plate 32 facing in the Z1 direction. In other words, the communication plate 32 is laminated on the surface of the pressure chamber substrate 34 facing in the Z2 direction. A nozzle substrate 46 and a compliance substrate 48 are disposed on the surface of the communication plate 32 facing in the Z2 direction. The respective elements of the liquid ejecting head 10 are plate-like members elongated in the Y-axis direction, schematically similarly to the communication plate 32, and are joined to each other with an adhesive.

As exemplified in FIG. 2, the nozzle substrate 46 is a plate-like member in which M nozzles N arrayed in a nozzle row Ln parallel to the Y-axis are formed. An array direction in which the M nozzles N are arrayed extends in the Y-axis direction. The nozzle substrate 46 is, for example, a silicon substrate. As exemplified in FIG. 3, the nozzle substrate 46 has a surface FN1 facing in the Z2 direction and a surface FN2 facing in the Z1 direction. The surface FN2 is closer to the pressure chamber substrate 34 than is the surface FN1. Note that the surface FN1 is an example of a first surface. The surface FN2 is positioned opposite to the surface FN1 and is an example of a second surface. A thickness direction of the nozzle substrate 46 extends in the Z-axis direction. In the present embodiment, the nozzle row Ln extends parallel to the Y-axis and corresponds to a line segment extending from the center of gravity GD2 of an ejection opening D2 of a downstream nozzle portion ND, which will be described later, of a nozzle N positioned furthest in the Y1 direction of the M nozzles N to the center of gravity GD2 of an ejection opening D2 of a downstream nozzle portion ND of a nozzle N positioned furthest in the Y2 direction. Note that the array of the M nozzles N in the nozzle row Ln conceptually includes at least some of the M nozzles N being somewhat misaligned in a direction crossing the nozzle row Ln and refers to some or all of the M nozzles N overlapping each other when viewed in the nozzle row Ln.

Each of the nozzles N is a through-hole through which ink flows. M is an integer of 2 or more but may be 1. Details of the shape of the nozzle N will be described later with reference to FIG. 4.

The communication plate 32 is a plate-like member provided with a channel in which ink flows. As exemplified in FIGS. 2 and 3, an opening 322, a second communication path 324, and a first communication path 326 are formed in the communication plate 32. The opening 322 is a through hole provided in common to the M nozzles N in the Y-axis direction when viewed in the Z-axis direction. Hereinafter, the Z-axis direction view may be referred to as “plan view”. The second communication path 324 and the first communication path 326 are through holes individually formed in each of the nozzles N. As exemplified in FIG. 3, a common channel 328 extending across M second communication paths 324 is formed on the surface of the communication plate 32 facing in the Z2 direction. The common channel 328 is a channel that enables the opening 322 and the M second communication paths 324 to communicate with each other.

Note that the communication plate 32 and the pressure chamber substrate 34 are formed by processing a silicon single-crystal substrate by using a semiconductor manufacturing technique such as etching. However, the respective elements of the liquid ejecting head 10 may be manufactured by any method.

The housing 42 is a structure formed by performing injection molding on a resin material, for example, and is fixed to the surface of the communication plate 32 facing in the Z1 direction. As exemplified in FIG. 3, a storage section 422 and the inlet 424 are formed in the housing 42. The storage section 422 is a recess having an outer shape corresponding to the opening 322 of the communication plate 32. The inlet 424 is a through hole communicating with the storage section 422. As understood from FIG. 3, a space in which the opening 322 of the communication plate 32 and the storage section 422 of the housing 42 communicate with each other functions as a liquid reservoir RS. The ink supplied from the liquid container 14 flows through the inlet 424 and is accumulated in the liquid reservoir RS.

The compliance substrate 48 has a function of buffering vibration of the ink in the liquid reservoir RS. The compliance substrate 48 includes, for example, an elastically deformable and flexible sheet member. Specifically, the compliance substrate 48 is disposed on the surface of the communication plate 32 facing in the Z2 direction so as to close the opening 322, the common channel 328, and a plurality of second communication paths 324 of the communication plate 32 and to constitute a bottom surface of the liquid reservoir RS.

As exemplified in FIGS. 2 and 3, the pressure chamber substrate 34 is a plate-like member in which M pressure chambers CV corresponding to the respective M nozzles N are formed. The M pressure chambers CV are arrayed with a gap therebetween in the Y-axis direction. Each of the pressure chambers CV is an opening extending in the X-axis direction. An end of the pressure chamber CV in the X1 direction overlaps one second communication path 324 in plan view, and an end of the pressure chamber CV in the X2 direction overlaps one first communication path 326 of the communication plate 32 in plan view.

The vibration plate 36 is disposed on the surface of the pressure chamber substrate 34 opposite to the surface facing the communication plate 32. The vibration plate 36 is an elastically deformable plate-like member. As exemplified in FIG. 3, the vibration plate 36 is a stack of an elastic film 361 and an insulating film 362. The insulating film 362 is positioned on a side of the elastic film 361 opposite to a side on which the pressure chamber substrate 34 is disposed. The elastic film 361 is formed of, for example, silicon oxide. The insulating film 362 is formed of, for example, zirconium oxide.

As understood from FIG. 3, the communication plate 32 and the vibration plate 36 face each other through the respective pressure chambers CV with a gap therebetween. Each of the pressure chambers CV is a void which is located between the communication plate 32 and the vibration plate 36 and in which pressure is applied to the ink stored in the pressure chamber CV. The vibration plate 36 forms a portion of a wall surface of the pressure chamber CV. The ink accumulated in the liquid reservoir RS flows through the common channel 328 so as to branch to the respective second communication paths 324 and is supplied to the M pressure chambers CV in parallel and stored. In other words, the liquid reservoir RS functions as a common liquid chamber from which ink is supplied to a plurality of pressure chambers CV.

As exemplified in FIGS. 2 and 3, the M piezoelectric elements PZ corresponding to the respective M nozzles N are disposed on the surface of the vibration plate 36 opposite to the surface on which the pressure chamber substrate 34 is disposed. Each of the piezoelectric elements PZ is an actuator that deforms in response to the drive signal Com being supplied and is formed so as to be elongated in the X-axis direction. The M piezoelectric elements PZ are arrayed in the Y-axis direction so as to correspond to the M pressure chambers CV. When the vibration plate 36 is vibrated in conjunction with deformation of the piezoelectric element PZ, the pressure in the pressure chamber CV changes. The piezoelectric element PZ is a driving element that vibrates the vibration plate 36.

In the following, to distinguish the M piezoelectric elements PZ, the M piezoelectric elements PZ may be referred to as a first piezoelectric element PZ, a second piezoelectric element PZ, . . . , and an Mth piezoelectric element PZ in order. Moreover, an mth piezoelectric element PZ may be referred to as a piezoelectric element PZ[m]. The variable m is an integer satisfying 1 or more and M or less. Further, when a component, a signal, or the like of the liquid ejecting apparatus 100 corresponds to the piezoelectric element PZ, a symbol for representing the component, the signal, or the like may be represented by adding a suffix [m] indicating that the component, the signal, or the like corresponds to the number m. For example, an mth nozzle N may be referred to as a nozzle N[m]. As illustrated in FIG. 2, a nozzle N positioned furthest in the Y2 direction of the M nozzles N is referred to as a nozzle N[1], and a nozzle N positioned furthest in the Y1 direction is referred to as a nozzle N[M].

When the vibration plate 36 is vibrated in conjunction with deformation of the piezoelectric element PZ, the pressure in the pressure chamber CV changes, and the ink that fills the pressure chamber CV is ejected through the first communication path 326 and the nozzle N.

The sealing member 44 in FIGS. 2 and 3 is a structure that protects the M piezoelectric elements PZ from the outside air and improves the mechanical strength of the pressure chamber substrate 34 and the vibration plate 36. The sealing member 44 is fixed to the surface of the vibration plate 36 with an adhesive, for example. The sealing member 44 has a recess formed in a surface facing the vibration plate 36, and the plurality of piezoelectric elements PZ are housed in the recess.

As exemplified in FIG. 3, a wiring board 50 is bonded to the surface of the vibration plate 36. The wiring board 50 is a mounting component having a plurality of wires that electrically couple the control module 6 to the liquid ejecting head 10. For example, a flexible wiring board 50, such as an FPC or an FFC, may be suitably adopted. Here, "FPC" is an abbreviation for "flexible printed circuit", and "FFC" is an abbreviation for "flexible flat cable". A driving circuit 51 is mounted on the wiring board 50. The driving circuit 51 is an electric circuit for switching whether or not to supply the drive signal Com to the piezoelectric element PZ in accordance with control performed by the print signal SI.

1-3. Nozzle N Shape

Figure 4:
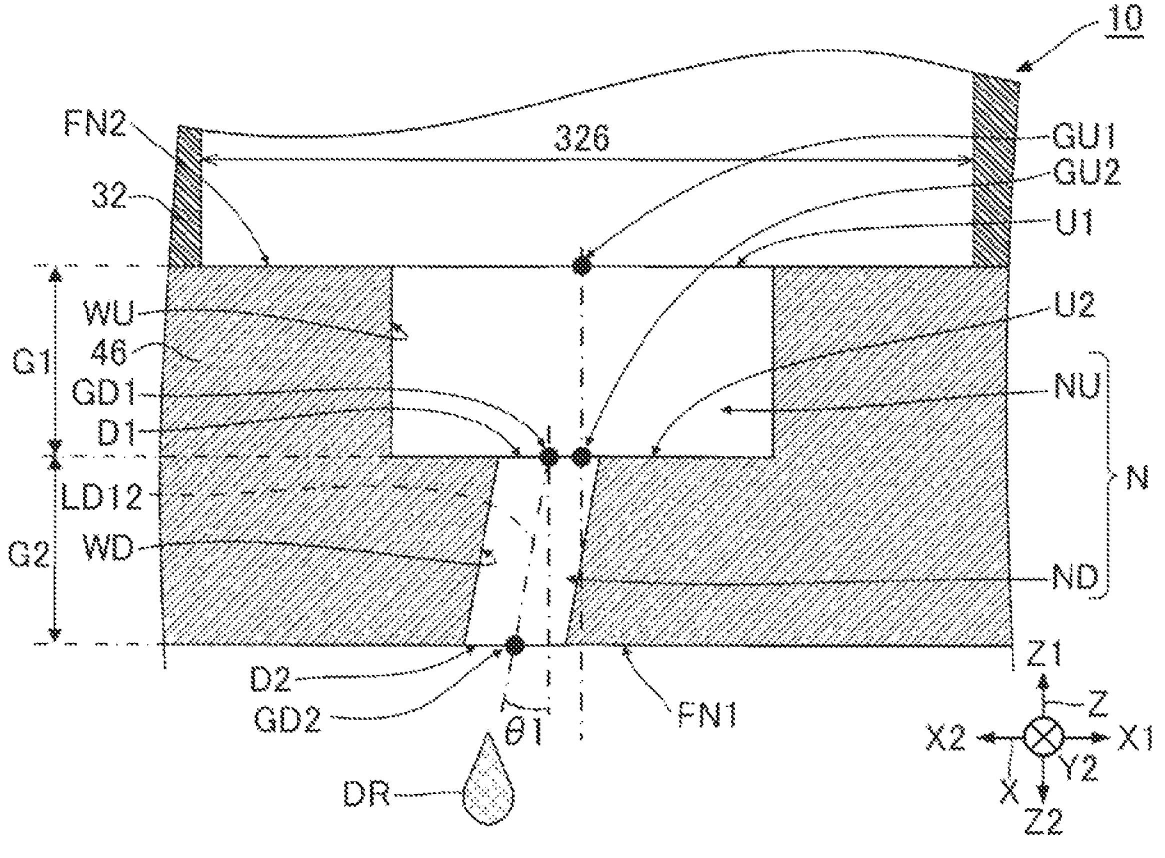
FIG. 4 illustrates the vicinity of a nozzle N in FIG. 3 in an enlarged manner.
Figure 5:
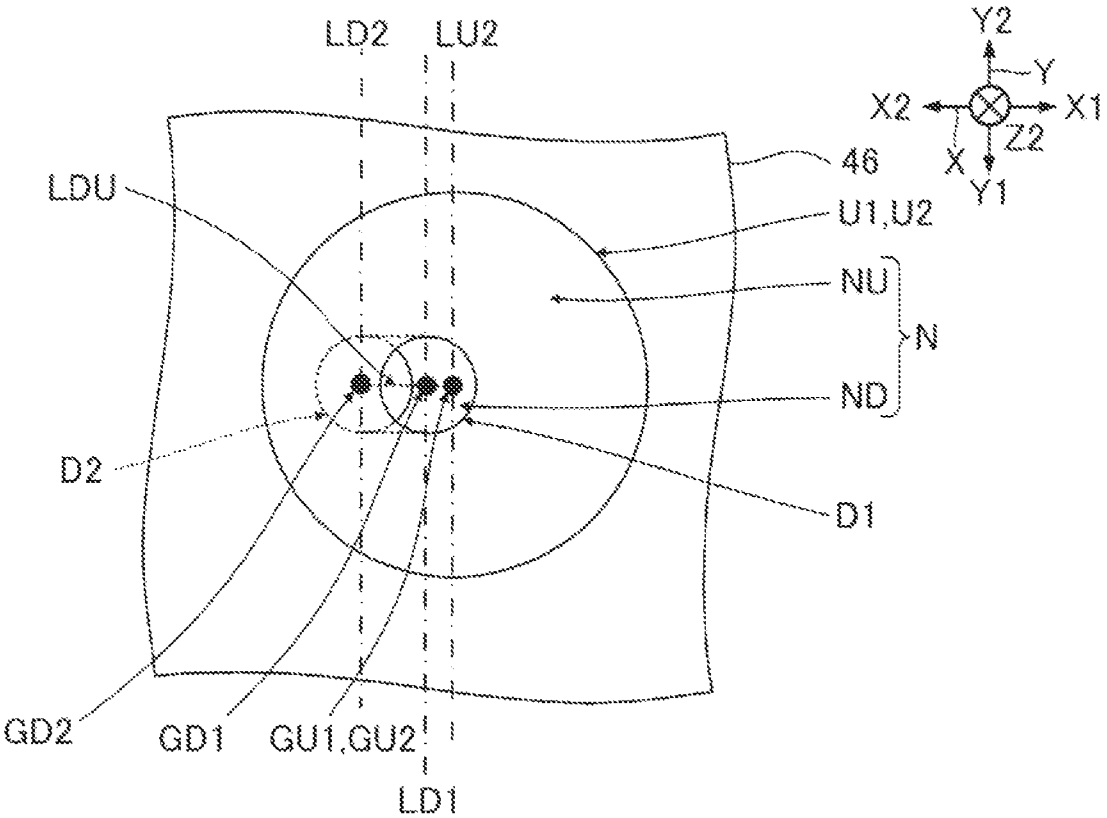
FIG. 5 is a plan view of the vicinity of the nozzle N.

FIG. 4 illustrates the vicinity of the nozzle N in FIG. 3 in an enlarged manner. FIG. 5 is a plan view of the vicinity of the nozzle N. As illustrated in FIGS. 4 and 5, the nozzle N has the downstream nozzle portion ND and an upstream nozzle portion NU positioned upstream of the downstream nozzle portion ND. The upstream nozzle portion NU includes a supply opening U1 opened in the surface FN2 and a bottom surface U2 facing the supply opening U1. More specifically, the upstream nozzle portion NU is a substantially columnar void in which the supply opening U1 and the bottom surface U2 serve as bottom surfaces and a wall surface WU serves as a side surface. The bottom surface U2 is a surface taking the Z-axis as a normal vector. In other words, the bottom surface U2 is a surface parallel to the XY plane. However, the bottom surface U2 may be a surface crossing the XY plane. In the first embodiment, the supply opening U1 and the bottom surface U2 have substantially the same shape. Thus, as illustrated in FIGS. 4 and 5, the position of the center of gravity GU1 of the supply opening U1 and the position of the center of gravity GU2 of the bottom surface U2 are substantially the same in plan view. The center of gravity is a point where the sum for the first moment of area of the target shape is zero. For example, when the target shape is a circle, the center of gravity is the center of the circle, and when the target shape is a parallelogram, the center of gravity is an intersection of two diagonals of the parallelogram. Here, "substantially the same" includes not only an instance of being perfectly the same but also an instance of being deemed as the same with manufacturing errors taken into consideration.

The downstream nozzle portion ND includes the ejection opening D2 opened in the surface FN1 and a coupling section D1 opened in the bottom surface U2. More specifically, the downstream nozzle portion ND is a substantially columnar void which is inclined with respect to the Z-axis and in which the ejection opening D2 and the coupling section D1 serve as bottom surfaces and a wall surface WD serves as a side surface. In FIG. 5, the shapes of the supply opening U1, the bottom surface U2, the coupling section D1, and the ejection opening D2 are circular but are not limited to being circular and may be any shape such as an elliptical shape or a rectangular shape. The coupling section D1 and the ejection opening D2 have a diameter of, for example, 10 [μm] to 30 [μm]. The supply opening U1 and the bottom surface U2 have a diameter of, for example, 15 [μm] to a smaller value of an upper limit value according to the resolution of the liquid ejecting apparatus 100 and the width of the first communication path 326. For example, when the resolution of the liquid ejecting apparatus 100 is 600 dpi, the upper limit value according to the resolution of the liquid ejecting apparatus 100 is obtained by 25.4 [mm]/600 and is substantially 0.0423 [mm], in other words, substantially 42.3 [μm]. Here, [μm] denotes micrometers, [mm] denotes millimeters, and "dpi" is an abbreviation for "dots per inch".

Moreover, FIG. 4 indicates that a distance G2 from the surface FN1 to the bottom surface U2 and a distance G1 from the bottom surface U2 to the surface FN2 are equal to each other, but they are not limited to being equal to each other. For example, the distance G2 may be longer than or shorter than the distance G1.

As illustrated in FIG. 5, the ejection opening D2 and the coupling section D1 are positioned inside the supply opening U1 and the bottom surface U2 in plan view. Thus, a sectional area of the upstream nozzle portion NU is larger than a sectional area of the downstream nozzle portion ND in plan view. However, a portion or entirety of the ejection opening D2 may be positioned outside the supply opening U1 and the bottom surface U2 in plan view. Further, an area of the ejection opening D2 and an area of the coupling section D1 are substantially the same but may differ from each other in plan view. For example, the downstream nozzle portion ND may have a tapered shape with a sectional area decreasing toward the Z2 direction side.

As illustrated in FIG. 4, an angle θ1 formed by the Z-axis direction and a line segment LD12 coupling the center of gravity GD2 of the ejection opening D2 and the center of gravity GD1 of the coupling section D1 is larger than 0 degrees and smaller than 90 degrees. For example, the angle θ1 is equal to or larger than 0.05 degrees and smaller than degrees. As illustrated in FIG. 4, the downstream nozzle portion ND is inclined along the line segment LD12 with respect to the surface FN1. In the following, it may be described that inclination of the downstream nozzle portion ND increases when the angle θ1 increases, in other words, when the angle θ1 approaches the direction perpendicular to the Z-axis.

1-4. Ejection Direction from Nozzle N

A manufacturing process of the nozzle substrate 46 according to the disclosure includes a nozzle forming step of forming the downstream nozzle portion ND and the upstream nozzle portion NU on a silicon wafer resulting in a plurality of nozzle substrates 46 and a step of cutting out the nozzle substrate 46 from the silicon wafer. In the nozzle forming step, for example, dry etching is desirably performed. However, the upstream nozzle portion NU and the downstream nozzle portion ND may be inclined with respect to the surface FN1 due to, for example, a variation in a shape of a mask pattern formed on the silicon wafer during dry etching or a variation in density distribution of plasma used for dry etching. A nozzle substrate 46-A in a first reference example in which the downstream nozzle portion ND is inclined with respect to the direction perpendicular to the surface FN1 will be described with reference to FIG. 6.

Figure 6:
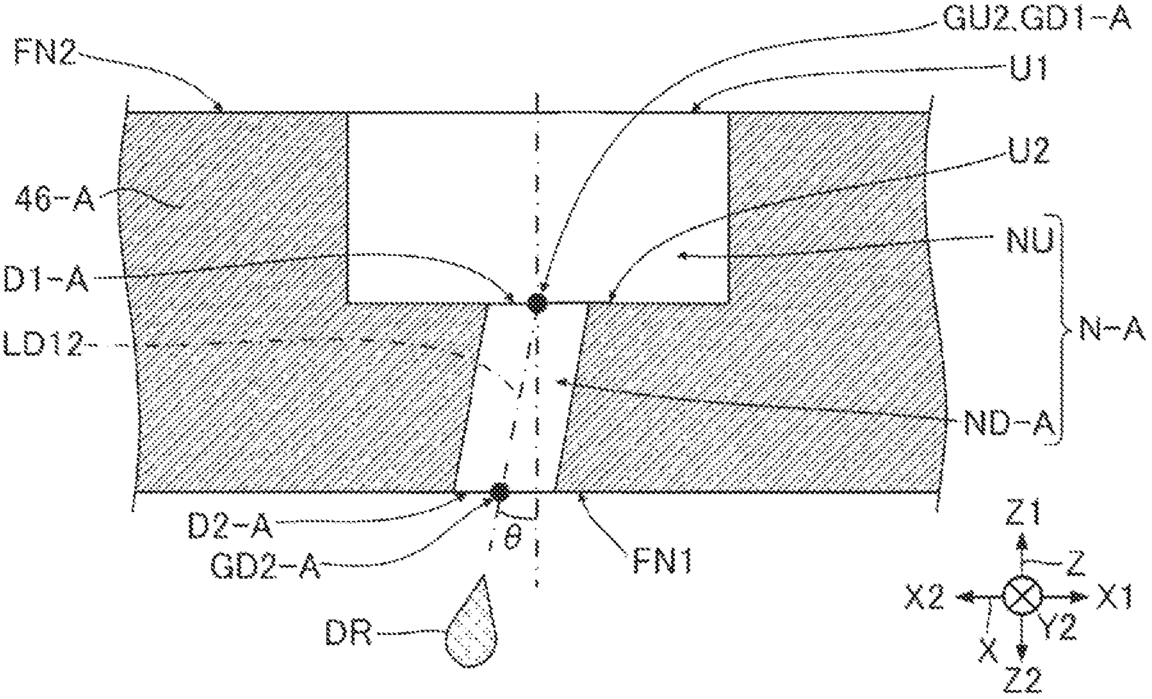
FIG. 6 is a view for explaining a nozzle substrate 46-A in a first reference example.

FIG. 6 is a view for explaining the nozzle substrate 46-A in the first reference example. FIG. 6 illustrates a sectional surface passing through a nozzle N-A formed in the nozzle substrate 46-A. The nozzle N-A in the first reference example differs from the nozzle N in terms of including a downstream nozzle portion ND-A instead of the downstream nozzle portion ND. As illustrated in FIG. 6, the downstream nozzle portion ND-A differs from the downstream nozzle portion ND in that the center of gravity GD1-A of a coupling section D1-A of the downstream nozzle portion ND-A overlaps the center of gravity GU2 of the bottom surface U2 of the upstream nozzle portion NU. The downstream nozzle portion ND-A is inclined along the line segment LD12 with respect to the surface FN1, similarly to the downstream nozzle portion ND. In other words, the downstream nozzle portion ND-A is inclined in the X2 direction toward the Z2 direction side. However, the downstream nozzle portion ND-A is not necessarily inclined in the X2 direction in all cases and may be inclined in any direction as long as the direction is perpendicular to the Z-axis.

In the first reference example, since the ink is ejected along the downstream nozzle portion ND-A, the ink ejection direction deviates from the Z-axis direction. In the following, the ink ejection direction deviating from the Z-axis direction may be referred to as "curving of trajectories" in some cases. In the example illustrated in FIG. 6, liquid droplets DR ejected from the nozzle N-A are ejected with deviation to the X2 direction side. When curving of trajectories occurs, the position at which ink lands on the medium PP deviates from the ideal landing position. When the position at which ink lands on the medium PP deviates from the ideal landing position, quality of an image formed on the medium PP is reduced.

Suppressing the inclination of the downstream nozzle portion ND at the time of manufacturing the nozzle substrate 46 is considered to bring the ink ejection direction close to the Z-axis direction. However, it is difficult to completely suppress a variation in the shape of a mask pattern formed on a silicon wafer during dry etching, a variation in the density distribution of plasma used for dry etching, or the like. Even when such factors are able to be completely reduced, the manufacturing process of the nozzle substrate 46 becomes complex or a high-cost apparatus is required in some cases.

As described above, the ink ejection direction is affected by the inclination of the downstream nozzle portion ND-A. On the other hand, the inventors have found by experiments that the ink ejection direction is also affected by the center of gravity GU2 of the bottom surface U2 and the center of gravity GD1 of the coupling section D1 separating from each other in plan view. In the following description, deviation of the position of the center of gravity GU2 from the position of the center of gravity GD1 may be expressed by using "coaxiality". The center of gravity GD1 and the center of gravity GU2 being close to each other may be described as having high coaxiality. The direction from the center of gravity GU2 to the center of gravity GD1 may be described as the direction of deviation of coaxiality. A nozzle substrate 46-B in a second reference example, in which the center of gravity GD1 separates from the center of gravity GU2, that is, in which coaxiality is low, will be described below with reference to FIG. 7.

Figure 7:
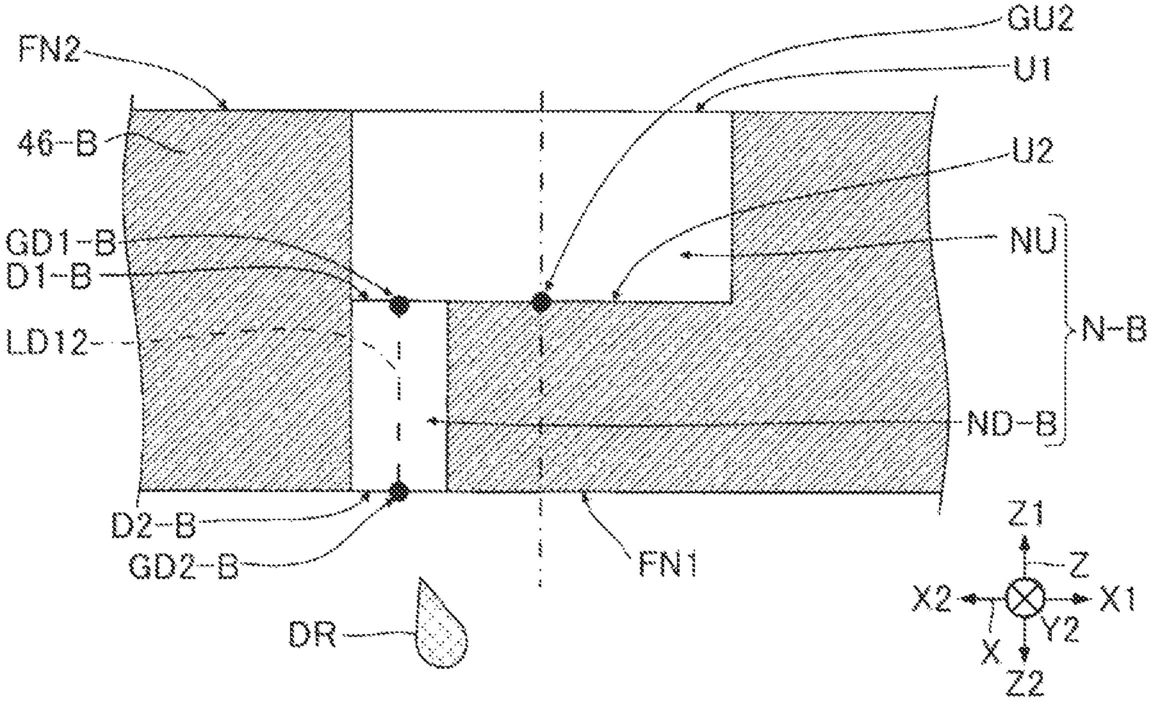
FIG. 7 is a view for explaining a nozzle substrate 46-B in a second reference example.

FIG. 7 is a view for explaining the nozzle substrate 46-B in the second reference example. FIG. 7 illustrates a sectional surface passing through a nozzle N-B formed in the nozzle substrate 46-B. The nozzle N-B in the second reference example differs from the nozzle N in terms of having a downstream nozzle portion ND-B instead of the downstream nozzle portion ND. As understood from FIG. 7, the downstream nozzle portion ND-B differs from the downstream nozzle portion ND in that the center of gravity GD1-B of a coupling section D1-B overlaps the center of gravity GD2-B of an ejection opening D2-B in the downstream nozzle portion ND-B; in other words, the downstream nozzle portion ND-B is orthogonal to the surface FN1 in plan view. That is, in the second reference example, the downstream nozzle portion ND-B is not inclined.

As illustrated in FIG. 7, the ink ejection direction in the second reference example is inclined from the center of gravity GD1-B to the center of gravity GU2. In other words, ink is ejected so as to deviate in a direction opposite to the direction of the deviation of coaxiality. In the example illustrated in FIG. 7, liquid droplets DR ejected from the nozzle N-B are ejected with deviation to the X1 direction side. The reasons why the ink ejection direction is inclined due to deviation of coaxiality are as follows: when the meniscus of the ink formed in the nozzle N shakes at a position deviating from the center of gravity GU2 at the time of ejection since the center of gravity GD1-B of the coupling section D1-B of the downstream nozzle portion ND-B deviates from the center of gravity GU2 of the bottom surface U2, the meniscus is moved to one side when the meniscus is pulled in the Z1 direction and reaches the upstream nozzle portion NU, and a pressure gradient is generated in a direction orthogonal to the Z-axis in the downstream nozzle portion ND-B.

Thus, the inventors have found that, even when the downstream nozzle portion ND is formed inclined, by providing the upstream nozzle portion NU so as to cancel out deviation of the ink ejection direction due to the inclination of the downstream nozzle portion ND, the deviation of the ink ejection direction is suppressed. That is, in the manufacturing process of the nozzle substrate 46, after the downstream nozzle portion ND is formed on a silicon wafer, the position at which the upstream nozzle portion NU is formed on the silicon wafer may be adjusted in accordance with the inclination of the downstream nozzle portion ND. For example, the upstream nozzle portion NU is formed such that a distance between the center of gravity GD1 and the center of gravity GU2 is 3 [μm] to 15 [μm], and preferably 4 [μm] to 11 [μm] in plan view.

A description will be given with reference back to FIGS. 4 and 5. In the present embodiment, as illustrated in FIG. 5, the center of gravity GD1 of the coupling section D1 is positioned between the center of gravity GD2 of the ejection opening D2 and the center of gravity GU2 of the bottom surface U2 in plan view. In the first embodiment, since the bottom surface U2 has substantially the same shape as the supply opening U1 in plan view, the center of gravity GD1 may be referred to as being positioned between the center of gravity GD2 and the center of gravity GU1 of the supply opening U1. Since the center of gravity GD1 is positioned between the center of gravity GD2 and the center of gravity GU1 in plan view, the center of gravity GD1 and the center of gravity GD2 necessarily differ from each other in position, the center of gravity GD1 and the center of gravity GU1 necessarily differ from each other in position, and the center of gravity GD2 and the center of gravity GU1 necessarily differ from each other in position.

Positioning between the center of gravity GD2 and the center of gravity GU2 in plan view is not necessarily limited to being at the position overlapping a line segment LDU coupling the center of gravity GD2 and the center of gravity GU2. As illustrated in FIG. 5, positioning between the center of gravity GD2 and the center of gravity GU2 refers to being at the position between a straight line LD2 and a straight line LU2. Here, the straight line LD2 is a straight line orthogonal to the line segment LDU and passing through the center of gravity GD2, and the straight line LU2 is a straight line orthogonal to the line segment LDU and passing through the center of gravity GU2. In other words, it can also be said that, in plan view, the center of gravity GD2 is positioned in the X2 direction and the center of gravity GU2 is positioned in the X1 direction with respect to a straight line LD1 orthogonal to the line segment LDU and passing through the center of gravity GD1. In the first embodiment, a description will be given by assuming that the line segment LDU extends in the X-axis direction.

Since the center of gravity GD2 is positioned in the X2 direction with respect to the center of gravity GD1 in plan view, a force in the X2 direction is applied to the ink ejected from the nozzle N. Further, since the center of gravity GU2 is positioned in the X1 direction with respect to the center of gravity GD1, a force in the X1 direction is applied to the ink ejected from the nozzle N. Thus, the force in the X1 direction and the force in the X2 direction applied to the ink ejected from the nozzle N cancel out each other. As a result, with the liquid ejecting head 10 according to the first embodiment, even when the downstream nozzle portion ND is formed inclined, the deviation of coaxiality is able to cancel out the deviation of the ejection direction, thus making it possible to suppress trajectories from curving.

Moreover, as illustrated in FIG. 5, the center of gravity GD2 of the ejection opening D2, the center of gravity GD1 of the coupling section D1, and the center of gravity GU2 of the bottom surface U2 are positioned on the same straight line in plan view. In the present embodiment, when a linear distance between the center of gravity GD1 and a line segment coupling the center of gravity GD2 and the center of gravity GU2 is equal to or less than 1 [μm], the center of gravity GD2 in plan view, the center of gravity GD1, and the center of gravity GU2 are deemed as being positioned on the same straight line with manufacturing errors taken into consideration.

Figure 8:
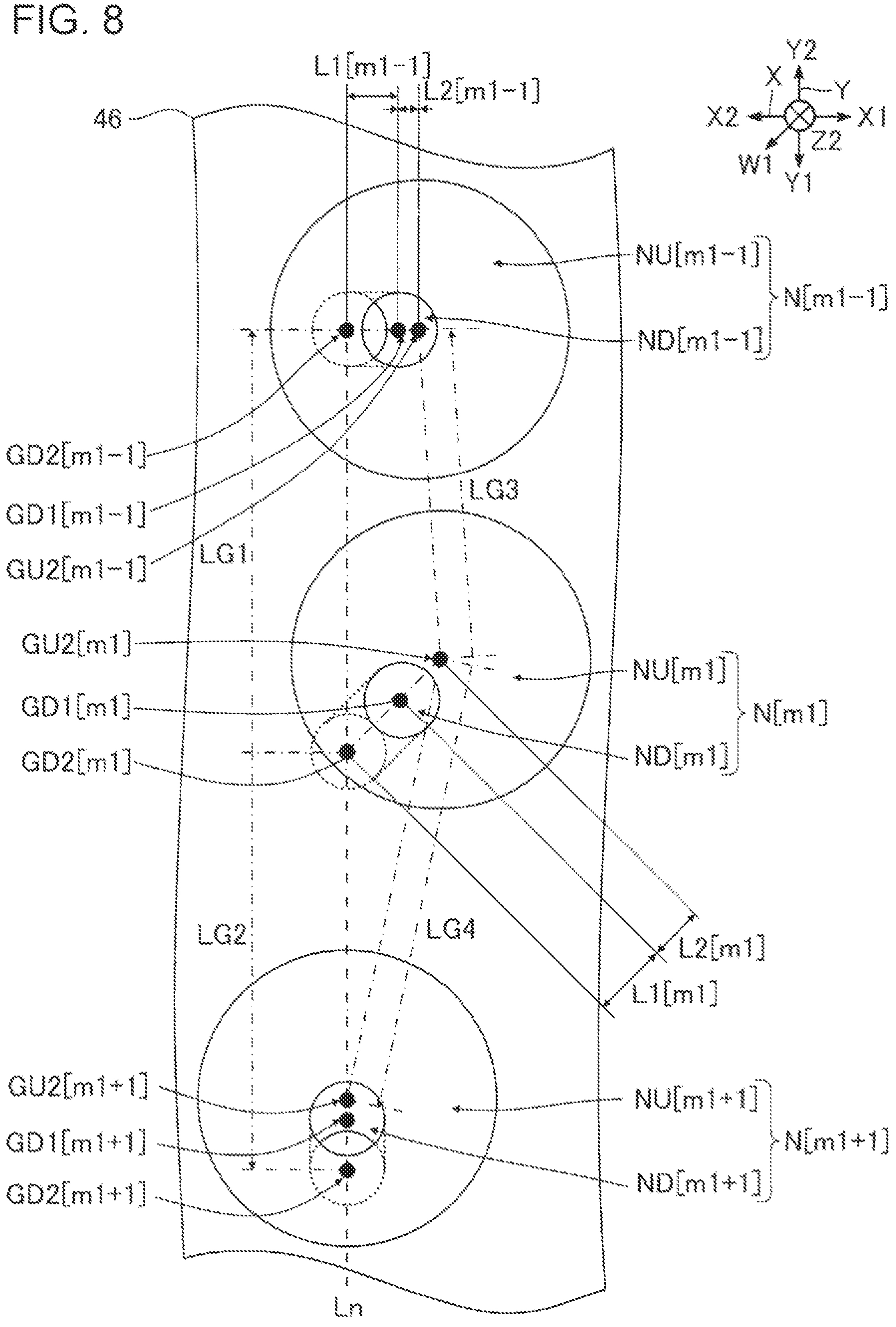
FIG. 8 is a view for explaining a positional relationship between nozzles N adjacent to each other.

FIG. 8 is a view for explaining the positional relationship between nozzles N adjacent to each other and illustrates a nozzle N[m1−1], a nozzle N[m1], and a nozzle N[m1+1], in which m1 is an integer of 2 or more and M−1 or less. Note that, to simplify the drawing, reference numerals for the supply opening U1, the bottom surface U2, the coupling section D1, and the ejection opening D2 will be omitted in FIG. 8.

Note that the nozzle N[m1] is an example of a first nozzle. A pressure chamber CV[m1] communicating with the nozzle N[m1] corresponds to a first pressure chamber. A piezoelectric element PZ[m1] that applies pressure to the ink in the pressure chamber CV[m1] corresponds to a first driving element. An upstream nozzle portion NU[m1] and a downstream nozzle portion ND[m1] of the nozzle N[m1] correspond to a first upstream nozzle portion and a first downstream nozzle portion, respectively. A supply opening U1[m1] and a bottom surface U2[m1] of the downstream nozzle portion ND[m1] correspond to a first supply opening and a first bottom surface, respectively. An ejection opening D2[m1] and a coupling section D1[m1] of the downstream nozzle portion ND[m1] correspond to a first ejection opening and a first coupling section, respectively. Though not illustrated in FIG. 8, when the nozzle N illustrated in FIG. 4 corresponds to the first nozzle, the line segment LD12 coupling the center of gravity GD2 and the center of gravity GD1 illustrated in FIG. 4 corresponds to a first line segment, and the angle θ1 formed by the line segment LD12 and the Z-axis corresponds to a first angle.

Further, regarding an integer m2 different from m1 of 1 to M, a nozzle N[m2] is an example of a second nozzle. In the example of FIG. 8, when m2 is assumed to be m1−1, the nozzle N[m1−1] may also be deemed as an example of the second nozzle. When the nozzle N[m1−1] corresponds to the second nozzle, a pressure chamber CV[m1−1] communicating with the nozzle N[m1−1] corresponds to a second pressure chamber. A piezoelectric element PZ[m1−1] that applies pressure to the ink in the pressure chamber CV[m1−1] corresponds to a second driving element. An upstream nozzle portion NU[m1−1] and a downstream nozzle portion ND[m1−1] of the nozzle N[m1−1] correspond to a second upstream nozzle portion and a second downstream nozzle portion, respectively. A supply opening U1[m1−1] and a bottom surface U2[m1−1] of the upstream nozzle portion NU[m1−1] are an example of a second supply opening and an example of a second bottom surface, respectively. An ejection opening D2[m1−1] and a coupling section D1[m1−1] of the downstream nozzle portion ND[m1−1] are an example of a second ejection opening and an example of a second coupling section, respectively. Though not illustrated in FIG. 8, when the nozzle N illustrated in FIG. 4 corresponds to the second nozzle, the line segment LD12 coupling the center of gravity GD2 and the center of gravity GD1 corresponds to a second line segment, and the angle θ1 formed by the line segment LD12 and the Z-axis corresponds to a second angle.

The nozzle N[m1−1] is positioned next to the nozzle N[m1]. Thus, the nozzle N[m1−1] may also be deemed as an example of a third nozzle. When the nozzle N[m1−1] corresponds to the third nozzle, the pressure chamber CV[m1-1] communicating with the nozzle N[m1−1] corresponds to a third pressure chamber. The piezoelectric element PZ[m1−1] that applies pressure to the ink in the pressure chamber CV[m1−1] corresponds to a third driving element. The upstream nozzle portion NU[m1−1] and the downstream nozzle portion ND[m1−1] of the nozzle N[m1−1] correspond to a third upstream nozzle portion and a third downstream nozzle portion, respectively. The supply opening U1[m1−1] and the bottom surface U2[m1−1] of the upstream nozzle portion NU[m1−1] are an example of a third supply opening and an example of a third bottom surface, respectively. The ejection opening D2[m1−1] and the coupling section D1[m1−1] of the downstream nozzle portion ND[m1−1] are an example of a third ejection opening and an example of a third coupling section, respectively.

The nozzle N[m1+1] is positioned next to the nozzle N[m1] and in the Y1 direction opposite to the Y2 direction serving as a direction from the nozzle N[m1] to the nozzle N[m1−1]. Thus, the nozzle N[m1+1] may be deemed as an example of a fourth nozzle. When the nozzle N[m1+1] corresponds to the fourth nozzle, a pressure chamber CV[m1+1] communicating with the nozzle N[m1+1] corresponds to a fourth pressure chamber. A piezoelectric element PZ[m1+1] that applies pressure to the ink in the pressure chamber CV[m1+1] corresponds to a fourth driving element. An upstream nozzle portion NU[m1+1] and a downstream nozzle portion ND[m1+1] of the nozzle N[m1+1] correspond to a fourth upstream nozzle portion and a fourth downstream nozzle portion, respectively. A supply opening U1[m1+1] and a bottom surface U2[m1+1] of the upstream nozzle portion NU[m1+1] are an example of a fourth supply opening and an example of a fourth bottom surface, respectively. An ejection opening D2[m1+1] and a coupling section D1[m1+1] of the downstream nozzle portion ND[m1+1] are an example of a fourth ejection opening and an example of a fourth coupling section, respectively.

In the example of FIG. 8, the downstream nozzle portion ND[m1−1] of the nozzle N[m1−1] is inclined in the X2 direction. A downstream nozzle portion ND[m] of the nozzle N[m] is inclined in the W1 direction. When viewed in the Z2 direction, the W1 direction corresponds to a direction obtained by rotating the Y1 direction clockwise by 45 degrees. The downstream nozzle portion ND[m1+1] of the nozzle N[m1+1] is inclined in the Y1 direction. To simplify the description, a description will be given by assuming that the bottom surface U2[m1−1], the bottom surface U2[m1], and the bottom surface U2[m1+1] have substantially the same position in the Z-axis direction.

The nozzle substrate 46 according to the present embodiment is characterized in that deviation of coaxiality increases with an increase in the inclination of the downstream nozzle portion ND. Specifically, in the example of FIG. 8, in plan view, a distance L1[m1] between the center of gravity GD1[m1] of the coupling section D1[m1] and the center of gravity GD2 of the ejection opening D2[m1] is longer than a distance L1[m1−1] between the center of gravity GD1[m1−1] of the coupling section D1[m1−1] and the center of gravity GD2 of the ejection opening D2[m1−1]. On the assumption that the bottom surface U2[m1−1] and the bottom surface U2[m1] have substantially the same position in the Z-axis direction, when the distance L1[m1] is longer than the distance L1[m1−1], an angle formed by the Z-axis and a line segment coupling the center of gravity GD2[m1] and the center of gravity GD1[m1] is necessarily larger than an angle formed by the Z-axis and a line segment coupling the center of gravity GD2[m1−1] and the center of gravity GD1[m1−1]. In other words, the downstream nozzle portion ND[m1] is inclined more than the downstream nozzle portion ND[m1−1]. With an increase in the inclination of the downstream nozzle portion ND, a degree of deviation of the ink ejection direction also increases. Thus, in the example of FIG. 8, a distance L2[m1] between the center of gravity GU2[m1] of the bottom surface U2[m1] and the center of gravity GD1 of the coupling section D1[m1] is longer than a distance L2[m1−1] between the center of gravity GU2[m1−1] of the bottom surface U2[m1−1] and the center of gravity GD1[m1−1] of the coupling section D1[m1−1].

The nozzle substrate 46 according to the present embodiment is characterized in that a gap between adjacent ejection openings D2 is nearly constant compared with a gap between adjacent bottom surfaces U2. In other words, a variation in the gap between adjacent ejection openings D2 is smaller than a variation in the gap between adjacent bottom surfaces U2. Specifically, as understood from FIG. 8, an absolute value of a difference between a distance LG1 and a distance LG2 is smaller than an absolute value of a difference between a distance LG3 and a distance LG4. The distance LG1 is a distance from the center of gravity GD2[m1] of the ejection opening D2[m1] to the center of gravity GD2[m1−1] of the ejection opening D2[m1−1] in plan view. The distance LG2 is a distance from the center of gravity GD2[m1] of the ejection opening D2[m1] to the center of gravity GD2[m1+1] of the ejection opening D2[m1+1] in plan view. The distance LG3 is a distance from the center of gravity GU2[m1] of the bottom surface U2[m1] to the center of gravity GU2[m1−1] of the bottom surface U2[m1−1]. The distance LG4 is a distance from the center of gravity GU2[m1] of the bottom surface U2[m1] to the center of gravity GU2[m1+1] of the bottom surface U2[m1+1]. In the example of FIG. 8, an absolute value of a difference between the distance LG1 and the distance LG2 is substantially 0.

Note that the distance LG1 is an example of a first distance. The distance LG2 is an example of a second distance. The distance LG3 is an example of a third distance. The distance LG4 is an example of a fourth distance.

Moreover, as understood from FIG. 8, the respective centers of gravity GD2 of M ejection openings D2 are positioned on the nozzle row Ln parallel to the Y-axis. In other words, the respective centers of gravity GD2 of the M ejection openings D2 have substantially the same position in the X-axis direction. On the other hand, the upstream nozzle portion NU is provided in accordance with an inclination direction and an inclination degree of the downstream nozzle portion ND. Thus, the respective centers of gravity GU2 of M bottom surfaces U2 may differ from each other in position in the X-axis direction.

1-5. Summary of First Embodiment

The first embodiment will be summarized below with reference to an m1th piezoelectric element PZ[m1] of the M piezoelectric elements PZ, in which m1 is an integer of 1 or more and M or less.

As above, the liquid ejecting head 10 according to the first embodiment includes: the piezoelectric element PZ[m1]; the pressure chamber CV[m1] that is partitioned on the pressure chamber substrate 34 and applies pressure to ink by driving of the piezoelectric element PZ[m1]; and the nozzle N[m1] that is formed in the nozzle substrate 46, communicates with the pressure chamber CV[m1], and ejects the ink, in which the nozzle substrate 46 includes the surface FN1 and the surface FN2 closer to the pressure chamber substrate 34 than is the surface FN1, the nozzle N[m1] includes the upstream nozzle portion NU[m1] including the supply opening U1[m1] opened in the surface FN2 and the bottom surface U2[m1] facing the supply opening U1[m1] and the downstream nozzle portion ND[m1] including the ejection opening D2[m1] opened in the surface FN1 and the coupling section D1[m1] opened in the bottom surface U2[m1], a sectional area of the upstream nozzle portion NU[m1] is larger than a sectional area of the downstream nozzle portion ND[m1] when viewed in a thickness direction of the nozzle substrate 46, that is, when viewed in the Z-axis direction, and the center of gravity GD1[m1] of the coupling section D1[m1] is positioned between the center of gravity GD2[m1] of the ejection opening D2[m1] and the center of gravity GU2[m1] of the bottom surface U2[m1] when viewed in the Z-axis direction.

The center of gravity GD1[m1] being positioned between the center of gravity GD2[m1] and the center of gravity GU2[m1] indicates that deviation of the ejection direction extending from the center of gravity GD1[m1] to the center of gravity GD2[m1] due to the inclination of the downstream nozzle portion ND[m1] and deviation of the ejection direction extending from the center of gravity GD1[m1] to the center of gravity GU2[m1] due to deviation of coaxiality cancel out each other. In the example of FIG. 5, deviation of the ejection direction of the X2 direction due to the inclination of the downstream nozzle portion ND and deviation of the ejection direction of the X1 direction due to deviation of coaxiality cancel out each other. Thus, with the liquid ejecting head 10 according to the first embodiment, even when the downstream nozzle portion ND[m1] is formed inclined, deviation of coaxiality is able to cancel out deviation of the ejection direction, thus making it possible to suppress trajectories from curving.

Moreover, an angle θ1[m1] formed by the Z-axis direction and a line segment LD12[m1] coupling the center of gravity GD2[m1] of the ejection opening D2[m1] and the center of gravity GD1[m1] of the coupling section D1[m1] is larger than 0 degrees and smaller than 90 degrees, and the downstream nozzle portion ND[m1] is inclined along the line segment LD12[m1] with respect to the surface FN1.

Moreover, when viewed in the Z-axis direction, the center of gravity GD2[m1] of the ejection opening D2[m1], the center of gravity GD1[m1] of the coupling section D1[m1], and the center of gravity GU2[m1] of the bottom surface U2[m1] are positioned on the same straight line.

The first embodiment will be further summarized below with reference to an m2th piezoelectric element PZ[m2], in which m2 is an integer of 1 to M and is different from m1. The liquid ejecting head 10 according to the first embodiment further includes: the piezoelectric element PZ[m2]; a pressure chamber CV[m2] that is partitioned on the pressure chamber substrate 34 and applies pressure to ink by driving of the piezoelectric element PZ[m2]; and the nozzle N[m2] that is formed in the nozzle substrate 46, communicates with the pressure chamber CV[m2], and ejects the ink, in which the nozzle N[m2] includes an upstream nozzle portion NU[m2] including a supply opening U1[m2] opened in the surface FN2 and a bottom surface U2[m2] facing the supply opening U1[m2] and a downstream nozzle portion ND[m2] including an ejection opening D2[m2] opened in the surface FN1 and a coupling section D1[m2] opened in the bottom surface U2[m2], a sectional area of the upstream nozzle portion NU[m2] is larger than a sectional area of the downstream nozzle portion ND[m2] when viewed in the Z-axis direction, the center of gravity GD1[m2] of the coupling section D1[m2] is positioned between the center of gravity GD2[m2] of the ejection opening D2[m2] and the center of gravity GU2[m2] of the bottom surface U2[m2] when viewed in the Z-axis direction, an angle θ1[m2] formed by the Z-axis and a line segment LD12[m2] coupling the center of gravity GD2[m2] of the ejection opening D2[m2] and the center of gravity GD1[m2] of the coupling section D1[m2] is larger than 0 degrees and smaller than 90 degrees, the downstream nozzle portion ND[m2] is inclined along the line segment LD12[m2] with respect to the surface FN1, and in a case in which the angle θ1[m1] is larger than the angle θ1[m2], a distance between the center of gravity GU2[m1] of the bottom surface U2[m1] and the center of gravity GD1[m1] of the coupling section D1[m1] is longer than a distance between the center of gravity GU2[m2] of the bottom surface U2[m2] and the center of gravity GD1[m2] of the coupling section D1[m2] when viewed in the Z-axis direction.

With an increase in the inclination of the downstream nozzle portion ND, a force that causes deviation from the center of gravity GD1 to the center of gravity GD2 due to the inclination of the downstream nozzle portion ND increases. Thus, by increasing deviation of coaxiality in accordance with an increase in the inclination of the downstream nozzle portion ND, it is possible to appropriately suppress trajectories from curving in accordance with the inclination of the downstream nozzle portion ND.

The first embodiment will be further summarized below with reference to an m1−1th piezoelectric element PZ[m1−1] and an m1+1th piezoelectric element PZ[m1+1], in which m1 is an integer of 2 to M−1. The liquid ejecting head 10 according to the first embodiment further includes: the piezoelectric element PZ[m1−1] and the piezoelectric element PZ[m1+1] that are different from the piezoelectric element PZ[m1]; the pressure chamber CV[m1−1] that is partitioned on the pressure chamber substrate 34 and applies pressure to ink by driving of the piezoelectric element PZ[m1−1]; the nozzle N[m1−1] that is formed in the nozzle substrate 46, communicates with the pressure chamber CV[m1-1], and ejects the ink; the pressure chamber CV[m1+1] that is partitioned on the pressure chamber substrate 34 and applies pressure to the ink by driving of the piezoelectric element PZ[m1+1]; and the nozzle N[m1+1] that is formed in the nozzle substrate 46, communicates with the pressure chamber CV[m1+1], and ejects the ink. The nozzle N[m1−1] is positioned next to the nozzle N[m1], and the nozzle N[m1+1] is positioned next to the nozzle N[m1] and in a direction opposite to a direction from the nozzle N[m1] to the nozzle N[m1−1]. The nozzle N[m1−1] includes the upstream nozzle portion NU[m1−1] including the supply opening U1[m1−1] opened in the surface FN2 and the bottom surface U2[m1−1] facing the supply opening U1[m1−1] and the downstream nozzle portion ND[m1−1] including the ejection opening D2[m1−1] opened in the surface FN1 and the coupling section D1[m1−1] opened in the bottom surface U2[m1−1]. When viewed in the Z-axis direction, a sectional area of the upstream nozzle portion NU[m1−1] is larger than a sectional area of the downstream nozzle portion ND[m1−1]. When viewed in the Z-axis direction, the center of gravity GD1[m1−1] of the coupling section D1[m1−1] is positioned between the center of gravity GD2[m1−1] of the ejection opening D2[m1−1] and the center of gravity GU2[m1−1] of the bottom surface U2[m1-1]. The nozzle N[m1+1] includes the upstream nozzle portion NU[m1+1] including the supply opening U1[m1+1] opened in the surface FN2 and the bottom surface U2[m1+1] facing the supply opening U1[m1+1] and the downstream nozzle portion ND[m1+1] including the ejection opening D2[m1+1] opened in the surface FN1 and the coupling section D1[m1+1] opened in the bottom surface U2[m1+1]. When viewed in the Z-axis direction, a sectional area of the upstream nozzle portion NU[m1+1] is larger than a sectional area of the downstream nozzle portion ND[m1+1]. When viewed in the Z-axis direction, the center of gravity GD1[m1+1] of the coupling section D1[m1+1] is positioned between the center of gravity GD2[m1+1] of the ejection opening D2[m1+1] and the center of gravity GU2[m1+1] of the bottom surface U2[m1+1]. In a case in which, when viewed in the Z-axis direction, a distance LG1 from the center of gravity GD2[m1] of the ejection opening D2[m1] to the center of gravity GD2[m1−1] of the ejection opening D2[m1−1], a distance LG2 from the center of gravity GD2[m1] of the ejection opening D2[m1] to the center of gravity GD2[m1+1] of the ejection opening D2[m1+1], a distance LG3 from the center of gravity GU2[m1] of the bottom surface U2[m1] to the center of gravity GU2[m1−1] of the bottom surface U2[m1−1], and a distance LG4 from the center of gravity GU2[m1] of the bottom surface U2[m1] to the center of gravity GU2[m1+1] of the bottom surface U2[m1+1] are used, an absolute value of a difference between the distance LG1 and the distance LG2 is smaller than an absolute value of a difference between the distance LG3 and the distance LG4.

Since ink is ejected from the ejection opening D2, when a gap between adjacent ejection openings D2 is not constant, a gap between dots formed on the medium PP is not constant, thus reducing quality of an image. Accordingly, a gap between adjacent ejection openings D2 is desirably constant. As a result, the liquid ejecting head 10 according to the first embodiment is able to improve quality of an image formed on the medium PP compared with an aspect in which a gap between adjacent bottom surfaces U2 is more constant than a gap between adjacent ejection openings D2.

Moreover, as illustrated in FIG. 8, the M ejection openings D2 have substantially the same position in the X-axis direction in plan view. When the position of the ejection opening D2 in the X-axis direction deviates, an ejection start position varies among nozzles N. When the ejection start position varies among nozzles N, it becomes difficult to adjust the landing position. Thus, with the liquid ejecting head 10 according to the first embodiment, the landing position is more easily adjusted than an aspect in which M bottom surfaces U2 are provided in the Y-axis direction.

Moreover, the liquid ejecting apparatus 100 according to the first embodiment includes the liquid ejecting head 10. With the liquid ejecting apparatus 100 according to the first embodiment, even when the downstream nozzle portion ND is formed inclined, deviation of coaxiality is able to cancel out deviation of the ejection direction, thus making it possible to suppress trajectories from curving.

Moreover, the liquid ejecting head 10 according to the first embodiment includes the nozzle substrate 46 according to the first embodiment. With the nozzle substrate 46 according to the first embodiment, even when the downstream nozzle portion ND is formed inclined, deviation of coaxiality is able to cancel out deviation of the ejection direction, thus making it possible to suppress trajectories from curving.

2. Modified Examples

The forms exemplified above can be modified in various manners. Specific modified aspects will be exemplified below. Two or more aspects selected in any manner from the following examples can be appropriately combined with each other within a range of not being inconsistent with each other.

2-1. First Modified Example

In the liquid ejecting head 10 according to the first embodiment, the center of gravity GD2[m1], the center of gravity GD1[m1], and the center of gravity GU2[m1] are positioned on the same straight line in plan view. However, the center of gravity GD2[m1], the center of gravity GD1[m1], and the center of gravity GU2[m1] may be positioned at a vertex of a triangle.

Figure 9:
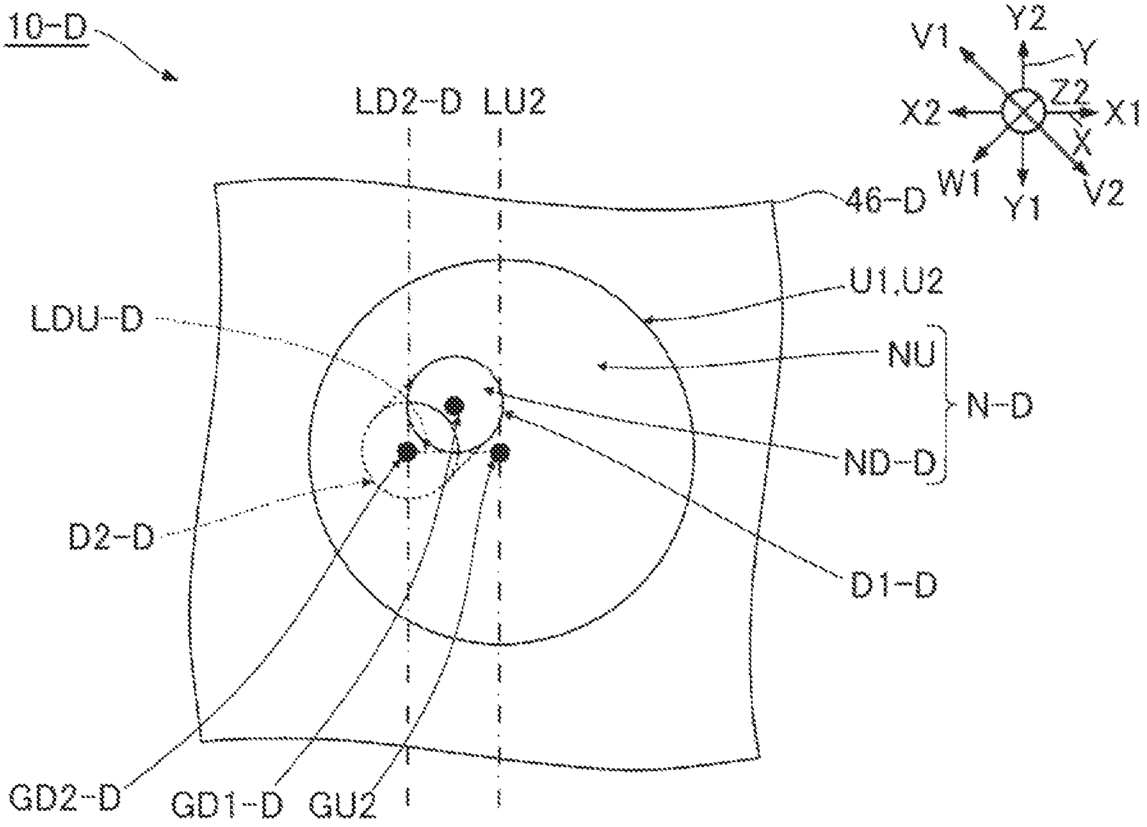
FIG. 9 is a plan view of the vicinity of a nozzle N-D according to a first modified example.

FIG. 9 is a plan view of the vicinity of a nozzle N-D according to the first modified example. A liquid ejecting head 10-D according to the first modified example differs from the liquid ejecting head 10 in terms of including a nozzle substrate 46-D instead of the nozzle substrate 46. The nozzle substrate 46-D differs from the nozzle substrate 46 in terms of including a downstream nozzle portion ND-D instead of the downstream nozzle portion ND. As illustrated in FIG. 9, the center of gravity GD1-D of a coupling section D1-D of the downstream nozzle portion ND-D is not positioned on a line segment LDU-D coupling the center of gravity GD2-D of the ejection opening D2-D and the center of gravity GU2 of the bottom surface U2 in plan view. The first modified example will be described by assuming that the line segment LDU-D extends in the X-axis direction.

The center of gravity GD1-D is positioned between the center of gravity GD2-D and the center of gravity GU2 in plan view. Specifically, the center of gravity GD1-D is positioned between a straight line LD2-D passing through the center of gravity GD2-D and orthogonal to the line segment LDU-D and the straight line LU2 passing through the center of gravity GU2 and orthogonal to the line segment LDU-D in plan view. The downstream nozzle portion ND-D is inclined in the W1 direction from the center of gravity GD1-D to the center of gravity GD2-D. Thus, the ejection direction deviates in the W1 direction due to the inclination of the downstream nozzle portion ND-D. On the other hand, the direction of deviation of coaxiality is the V1 direction from the center of gravity GU2 to the center of gravity GD1-D. When viewed in the Z2 direction, the V1 direction corresponds to a direction obtained by rotating the X2 direction counterclockwise by 45 degrees.

In the first modified example, a force by which ink is ejected in the W1 direction by the inclination of the downstream nozzle portion ND-D and a force by which ink is ejected in the V2 direction opposite to the V1 direction by deviation of coaxiality are generated. The W1 direction is able to be decomposed into an X2 direction component and a Y1 direction component. The V2 direction is able to be decomposed into an X1 direction component and a Y1 direction component. Thus, in the liquid ejecting head 10-D according to the first modified example, the X2 direction component of the force by which ink is ejected in the W1 direction and the X1 direction component of the force by which ink is ejected in the V2 direction cancel out each other. Accordingly, with the liquid ejecting head 10-D according to the first modified example, even when the downstream nozzle portion ND-D is formed inclined, deviation of coaxiality is able to cancel out deviation of the ejection direction, thus making it possible to suppress trajectories from curving.

Comparing the first modified example with the first embodiment, in the first modified example, the Y1 direction component of the force by which ink is ejected in the W1 direction and the Y1 direction component of the force by which ink is ejected in the V2 direction do not cancel out each other. On the other hand, in the first embodiment, since the center of gravity GD2[m1], the center of gravity GD1 [m1], and the center of gravity GU2[m1] are positioned on the same straight line, the direction in which ink is ejected by the inclination of the downstream nozzle portion ND and the direction in which ink is ejected by deviation of coaxiality are opposite to each other. As a result, compared with the liquid ejecting head 10-D according to the first modified example, the liquid ejecting head 10 according to the first embodiment is able to further suppress trajectories from curving.

2-2. Second Modified Example

In each of the aforementioned aspects, the position of the center of gravity GU1 of the supply opening U1 and the position of the center of gravity GU2 of the bottom surface U2 are substantially the same in plan view but may differ from each other.

Figure 10:
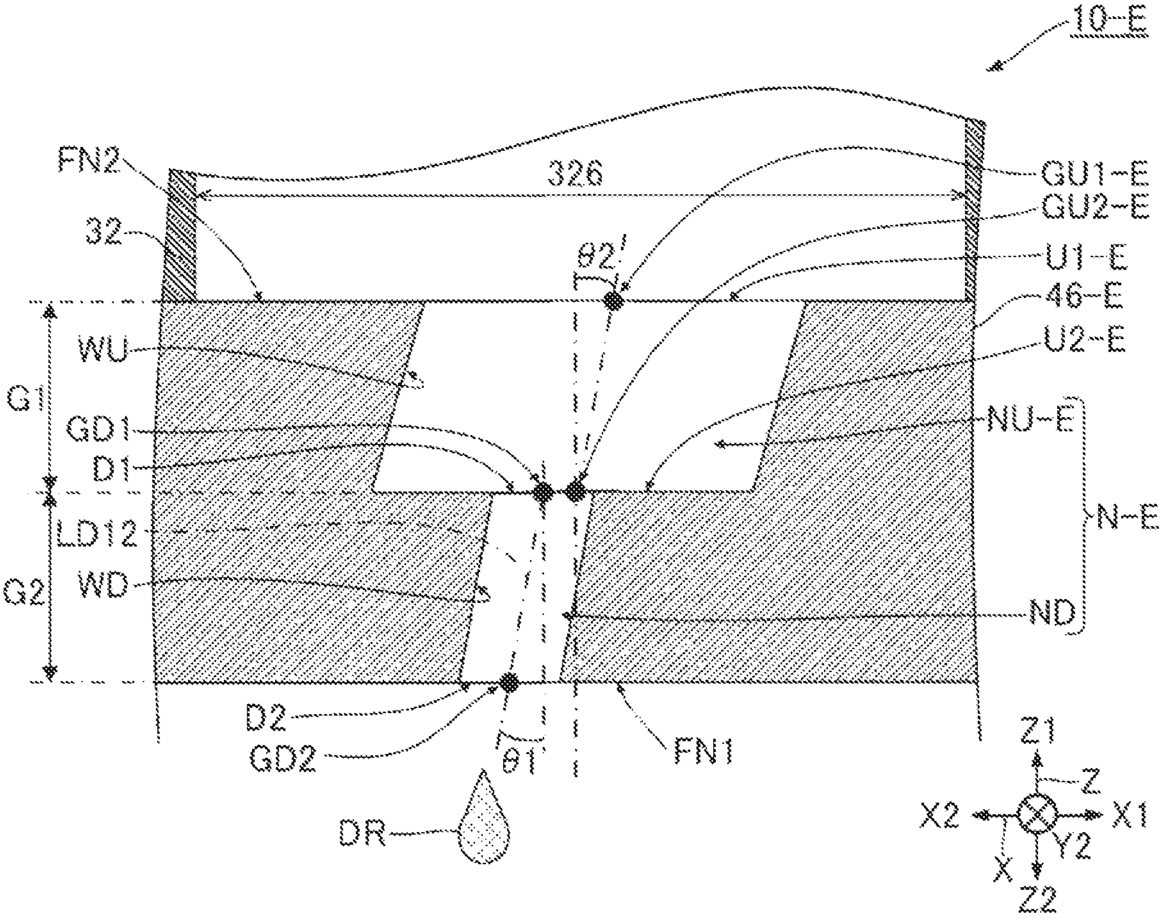
FIG. 10 is a sectional view of a nozzle N-E according to a second modified example.

FIG. 10 is a sectional view of a nozzle N-E according to a second modified example. A liquid ejecting head 10-E according to the second modified example differs from the liquid ejecting head 10 in terms of including a nozzle substrate 46-E instead of the nozzle substrate 46. The nozzle substrate 46-E differs from the nozzle substrate 46 in terms of including an upstream nozzle portion NU-E instead of the upstream nozzle portion NU. The upstream nozzle portion NU-E differs from the upstream nozzle portion NU in terms of being inclined with respect to the Z-axis by an angle θ2. The angle θ2 is larger than 0 degrees and smaller than 90 degrees. The angle θ2 may be the same as or differ from the angle θ1. In the example of FIG. 10, though the upstream nozzle portion NU-E is inclined in the X1 direction, the inclination direction is not limited to the X1 direction and may be any direction as long as the direction is orthogonal to the Z-axis.

As understood from FIG. 10, in the upstream nozzle portion NU-E, the center of gravity GU1-E of the supply opening U1-E differs from the center of gravity GU2-E of the bottom surface U2-E in position in plan view. With the liquid ejecting head 10-E according to the second modified example, even when the downstream nozzle portion ND is formed inclined, deviation of coaxiality is able to cancel out deviation of the ejection direction, thus making it possible to suppress trajectories from curving.

2-3. Third Modified Example

In each of the aforementioned aspects, an area of the supply opening U1 and an area of the bottom surface U2 are substantially the same but may differ from each other. For example, the upstream nozzle portion NU may have a tapered shape with a sectional area decreasing toward the Z2 direction side.

2-4. Fourth Modified Example

The liquid ejecting heads 10, 10-D and 10-E in each of the aforementioned aspects may include a heating element that heats ink in the pressure chamber CV instead of the piezoelectric element PZ. In a fourth modified example, the heating element is an example of a driving element.

2-5. Fifth Modified Example

In each of the aforementioned aspects, the liquid ejecting apparatus 100 of a serial type in which the liquid ejecting module HU is reciprocated in the X-axis direction is exemplified, but the disclosure is not limited to such an aspect. The liquid ejecting apparatus may be a liquid ejecting apparatus of a line type in which a plurality of nozzles N are distributed over the entire width of the medium PP.

2-6. Other Modified Examples

The liquid ejecting apparatus described above can be adopted for various kinds of equipment, such as a facsimile apparatus and a copying machine, in addition to equipment dedicated to printing. However, the liquid ejecting apparatus of the disclosure is not limited to being used for printing. For example, a liquid ejecting apparatus that ejects a solution of a color material is used as a manufacturing apparatus that forms a color filter of a liquid crystal display device. Further, a liquid ejecting apparatus that ejects a solution of a conductive material is used as a manufacturing apparatus that forms a wire and an electrode of a wiring board.

What is claimed is:

1. A liquid ejecting head comprising:
- a first driving element;
- a first pressure chamber that is partitioned on a pressure chamber substrate and applies pressure to a liquid by driving of the first driving element; and
- a first nozzle that is formed in a nozzle substrate, communicates with the first pressure chamber, and ejects the liquid, wherein the nozzle substrate includes
- a first surface and
- a second surface closer to the pressure chamber substrate than is the first surface, the first nozzle includes
- a first upstream nozzle portion including a first supply opening opened in the second surface and a first bottom surface facing the first supply opening and
- a first downstream nozzle portion including a first ejection opening opened in the first surface and a first coupling section opened in the first bottom surface, when viewed in a thickness direction of the nozzle substrate, a sectional area of the first upstream nozzle portion is larger than a sectional area of the first downstream nozzle portion, and when viewed in the thickness direction, a center of gravity of the first coupling section is positioned between a center of gravity of the first ejection opening and a center of gravity of the first bottom surface.

2. The liquid ejecting head according to claim 1, wherein a first angle formed by the thickness direction and a first line segment coupling the center of gravity of the first ejection opening and the center of gravity of the first coupling section is larger than 0 degrees and smaller than 90 degrees, and the first downstream nozzle portion is inclined along the first line segment with respect to the first surface.

3. The liquid ejecting head according to claim 1, wherein when viewed in the thickness direction, the center of gravity of the first ejection opening, the center of gravity of the first coupling section, and the center of gravity of the first bottom surface are positioned on a same straight line.

4. The liquid ejecting head according to claim 1, wherein when viewed in the thickness direction, a position of a center of gravity of the first supply opening differs from a position of the center of gravity of the first bottom surface.

5. The liquid ejecting head according to claim 2, further comprising:

a second driving element;

a second pressure chamber that is partitioned on the pressure chamber substrate and applies pressure to the liquid by driving of the second driving element; and a second nozzle that is formed in the nozzle substrate, communicates with the second pressure chamber, and ejects the liquid, wherein the second nozzle includes a second upstream nozzle portion including a second supply opening opened in the second surface and a second bottom surface facing the second supply opening and a second downstream nozzle portion including a second ejection opening opened in the first surface and a second coupling section opened in the second bottom surface, when viewed in the thickness direction, a sectional area of the second upstream nozzle portion is larger than a sectional area of the second downstream nozzle portion, when viewed in the thickness direction, a center of gravity of the second coupling section is positioned between a center of gravity of the second ejection opening and a center of gravity of the second bottom surface, a second angle formed by the thickness direction and a second line segment coupling the center of gravity of the second ejection opening and the center of gravity of the second coupling section is larger than 0 degrees and smaller than 90 degrees, the second downstream nozzle portion is inclined along the second line segment with respect to the first surface, and in a case in which the first angle is larger than the second angle, when viewed in the thickness direction, a distance between the center of gravity of the first bottom surface and the center of gravity of the first coupling section is longer than a distance between the center of gravity of the second bottom surface and the center of gravity of the second coupling section.

6. The liquid ejecting head according to claim 1, further comprising:

a third driving element;

a fourth driving element;

a third pressure chamber that is partitioned on the pressure chamber substrate and applies pressure to the liquid by driving of the third driving element;

a third nozzle that is formed in the nozzle substrate, communicates with the third pressure chamber, and ejects the liquid;

a fourth pressure chamber that is partitioned on the pressure chamber substrate and applies pressure to the liquid by driving of the fourth driving element; and a fourth nozzle that is formed in the nozzle substrate, communicates with the fourth pressure chamber, and ejects the liquid, wherein the first nozzle is positioned between the third nozzle and the fourth nozzle, the third nozzle includes a third upstream nozzle portion including a third supply opening opened in the second surface and a third bottom surface facing the third supply opening and a third downstream nozzle portion including a third ejection opening opened in the first surface and a third coupling section opened in the third bottom surface, when viewed in the thickness direction, a sectional area of the third upstream nozzle portion is larger than a sectional area of the third downstream nozzle portion, when viewed in the thickness direction, a center of gravity of the third coupling section is positioned between a center of gravity of the third ejection opening and a center of gravity of the third bottom surface, the fourth nozzle includes a fourth upstream nozzle portion including a fourth supply opening opened in the second surface and a fourth bottom surface facing the fourth supply opening and a fourth downstream nozzle portion including a fourth ejection opening opened in the first surface and a fourth coupling section opened in the fourth bottom surface, when viewed in the thickness direction, a sectional area of the fourth upstream nozzle portion is larger than a sectional area of the fourth downstream nozzle portion, when viewed in the thickness direction, a center of gravity of the fourth coupling section is positioned between a center of gravity of the fourth ejection opening and a center of gravity of the fourth bottom surface, and when viewed in the thickness direction, with a distance from the center of gravity of the first ejection opening to the center of gravity of the third ejection opening as a first distance, a distance from the center of gravity of the first ejection opening to the center of gravity of the fourth ejection opening as a second distance, a distance from the center of gravity of the first bottom surface to the center of gravity of the third bottom surface as a third distance, and a distance from the center of gravity of the first bottom surface to the center of gravity of the fourth bottom surface as a fourth distance, an absolute value of a difference between the first distance and the second distance is smaller than an absolute value of a difference between the third distance and the fourth distance.

7. A liquid ejecting apparatus comprising the liquid ejecting head according to claim 1.

8. A nozzle substrate comprising:

a first nozzle that ejects a liquid;

a first surface; and a second surface positioned opposite to the first surface, wherein the first nozzle includes a first upstream nozzle portion including a first supply opening opened in the second surface and a first bottom surface facing the first supply opening and a first downstream nozzle portion including a first ejection opening opened in the first surface and a first coupling section opened in the first bottom surface, when viewed in a thickness direction of the nozzle substrate, a sectional area of the first upstream nozzle portion is larger than a sectional area of the first downstream nozzle portion, and when viewed in the thickness direction, a center of gravity of the first coupling section is positioned between a center of gravity of the first ejection opening and a center of gravity of the first bottom surface.

* * * * *